United States Patent [19]

Jan

[11] Patent Number: 5,367,922
[45] Date of Patent: Nov. 29, 1994

[54] HYDRAULIC CONTROL SYSTEM FOR AN AUTOMATIC TRANSMISSION HAVING AN R-N-D CONTROL VALVE

[75] Inventor: Jaedeog Jan, Seoul, Rep. of Korea

[73] Assignee: Hyundai Motor Company, Seoul, Rep. of Korea

[21] Appl. No.: 989,574

[22] Filed: Dec. 11, 1992

[30] Foreign Application Priority Data

Feb. 24, 1992 [KR] Rep. of Korea .................... 92-2826

[51] Int. Cl.⁵ .......................................... F16H 47/00
[52] U.S. Cl. .................................. 74/732.1; 475/123
[58] Field of Search ...................... 74/869, 868, 732.1, 74/730.1, 640; 475/64, 123, 122

[56] References Cited

U.S. PATENT DOCUMENTS

| | | | |
|---|---|---|---|
| 4,501,174 | 2/1985 | Sugano | 74/868 X |
| 4,829,853 | 5/1989 | Sakaguchi | 74/868 X |
| 4,850,251 | 7/1989 | Kuwayama et al. | 74/869 X |
| 4,889,016 | 12/1989 | Kuwayama et al. | 74/868 |
| 5,005,444 | 4/1991 | Kimura et al. | 74/868 |
| 5,224,399 | 7/1993 | Baba et al. | 74/867 |

*Primary Examiner*—Rodney H. Bonck
*Attorney, Agent, or Firm*—Birch, Stewart, Kolasch & Birch

[57] ABSTRACT

An R-N-D control valve of a hydraulic control system is disclosed which ensures the prevention of shock that may occur at the time of an "N-R" and an "N-D" manual shift, by unifying a shift control pressure with one valve in the case of an "N-R" shift and an "N-D" shift and first-second speed shift. The present invention discloses that a line pressure generated from a manual valve is changed to a control pressure controlled by the proportional control of a linear valve, and transmitted to each clutch and brake according to the movement position of a spool of a valve by the line pressure.

7 Claims, 4 Drawing Sheets

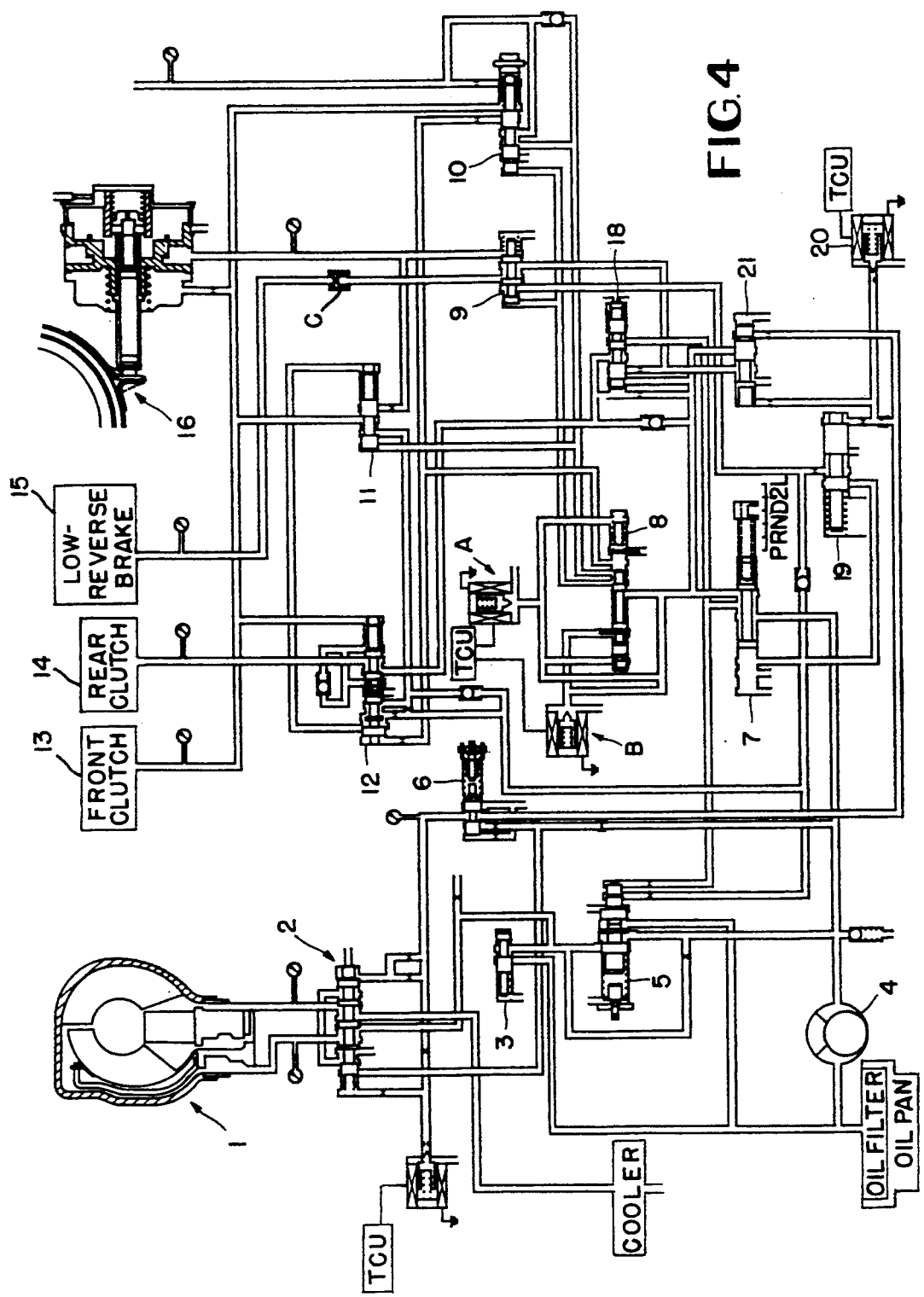

HYDRAULIC CONTROL SYSTEM FOR AN AUTOMATIC TRANSMISSION HAVING AN R-N-D CONTROL VALVE

BACKGROUND OF THE INVENTION

1. Field of the Invention

The present invention relates to a hydraulic control system for an automatic transmission having a reverse, drive and neutral control valve, and more particularly to a hydraulic control system which ensures the prevention of a shock which may occur at the time of an "N-R" AND an "N-D" manual shift, and can unify shift control pressure with one valve in case of an "N-R" and an "N-D" manual shift and a first-second speed shift.

2. Description of Related Art

A conventional automatic transmission has a torque converter and a multiple stage transmission gear mechanism connected with the torque converter, which includes hydraulically actuated friction members for selecting one of the gear stages of the transmission gear mechanism in accordance with vehicle operating conditions.

The hydraulic control system pressurized by a fluid pump provides the working pressure required to operate the friction members and control valves.

A commonly used automatic transmission of a vehicle has a fluid torque converter which generally includes a pump impeller connected with an engine output shaft to be driven thereby, a turbine runner with an output shaft member, and a stator disposed between the pump impeller and the turbine runner, so that hydraulic fluid is circulated by the engine driven pump impeller through the turbine runner with the aid of the stator which functions to deflect the hydraulic fluid from the turbine runner to a direction where the fluid flow does not disturb the rotation of the pump impeller when the fluid flows into the pump impeller.

An automatic shift is made by the operation of friction members such as clutches or a kick-down brake at each shift change. Also, a manual valve of which a port is converted by selecting a position of a selector lever, is designed to be supplied with fluid from a fluid pump and to supply the fluid to a shift control valve. In a 4-speed automatic transmission, the shift control valve has an operated port made by an electronic control system.

One example of a hydraulic pressure control system of an automatic transmission for a vehicle will be described in FIG. 4 which shows a circuit diagram of a conventional hydraulic control system comprising a torque converter 1 attached to an engine through the engine flexplate, and rotating at engine speed for transmitting power of the engine to an input shaft of the transmission gear mechanism, a damper clutch control valve 2 for controlling the application and release of a damper clutch to increase the power train efficiency inside the torque converter 1, a regulator valve 5 for regulating the output oil pressure of the fluid pump 4 according to the automatic transmission requirements, and a reducing valve 6 for regulating stably the supply of oil pressure to a solenoid valve and the damper clutch control valve 2.

A manual valve 7, which is connected to an outlet of the fluid pump 4 and is provided with the hydraulic pressure, is designed to deliver line pressure to the regulator valve 5 and a shift control valve. In the manual valve 7, lands are changed according to the position of a shift selector lever.

A shift control valve 8, which is operated in response to two shift control solenoid valves A and B controlled by a TCU is designed to transmit the oil pressure selectively through a first-second speed shift valve 9, an end clutch valve 10, a second-third and a third-fourth speed shift valve 11, and a rear clutch exhaust valve 12 to a front clutch 13, a rear clutch 14, a low and reverse brake 15, a kick down servo brake 16, an end clutch 17, and the like. An N-D control valve 18 is connected to the rear clutch 14. An N-R control valve 19 is connected to the first-second speed shift valve so as to reduce the impact caused by the shift.

Also, a pressure control solenoid valve 20 is connected to a pressure control valve 21 to reduce the shock produced by the control at the time of shifting.

The conventional hydraulic control system includes an N-R control valve and an N-D control valve to reduce the shift impact while is manually shifting from a neutral "N" range to a drive "D" range or a reverse "R" range. In this case, since the line pressure is controlled by a regulator valve, the N-R and N-D control valves, the control pressure becomes NON-linear and the system has a complicated structure.

When the control pressure is not linear, the shift impact occurs at the time between either manual shifting of N-R of and N-D. The N-R and N-D control valves are separately installed, so that the hydraulic circuit is complicated.

SUMMARY OF THE INVENTION

The object of the present invention is to provide a hydraulic control system for an automatic transmission having an R-N-D control valve to eliminate the above-described problems of the conventional system, wherein the system is structurally simplified by unifying three valves and increases the shift efficiency by changing control pressure linearly.

The system includes a fluid pump, a manual valve which is shifted by a shift lever and delivers the hydraulic pressure to each valve, a proportional solenoid valve which is connected to the manual valve and controlled by a transmission control unit so as to proportionally control the hydraulic pressure, an R-N-D control valve for reducing a shift impact which occurs when the manual valve is shifted from an "N" range to a "D"/"R" as the hydraulic pressure is applied to the R-N-D control valve via the manual valve and the proportional solenoid valve, having a housing and a valve spool, said R-N-D control valve comprising a port "f" receiving the hydraulic pressure generated from a fluid pump via the linear solenoid valve when the manual valve is shifted from the "N" range to the "D"/"R" range, ports "a" and "b" connected to a second speed line and respectively supplying the hydraulic pressure to the left and right sides of a land L1 of the valve spool, a port "h" which supplies the hydraulic pressure transmitted to the manual valve to the right side of a large land L4 of the valve spool, ports "c" and "d" which are opened or closed according to a land L2 position changed by the hydraulic pressure which flows into the ports "a" and "b" and port "h", a check ball mounted between the manual valve and the proportional solenoid valve to selectively cut off the forward and reverse hydraulic pressure; and a shift control valve which selectively delivers the hydraulic pressure to the valve applied from the manual valve by the operation of two shift control solenoid valves controlled by a transmission control unit according to the vehicle speed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 is a circuit diagram of a conventional hydraulic control system for an automatic transmission.

DETAILED DESCRIPTION OF THE PREFERRED EMBODIMENT

Figure 1:
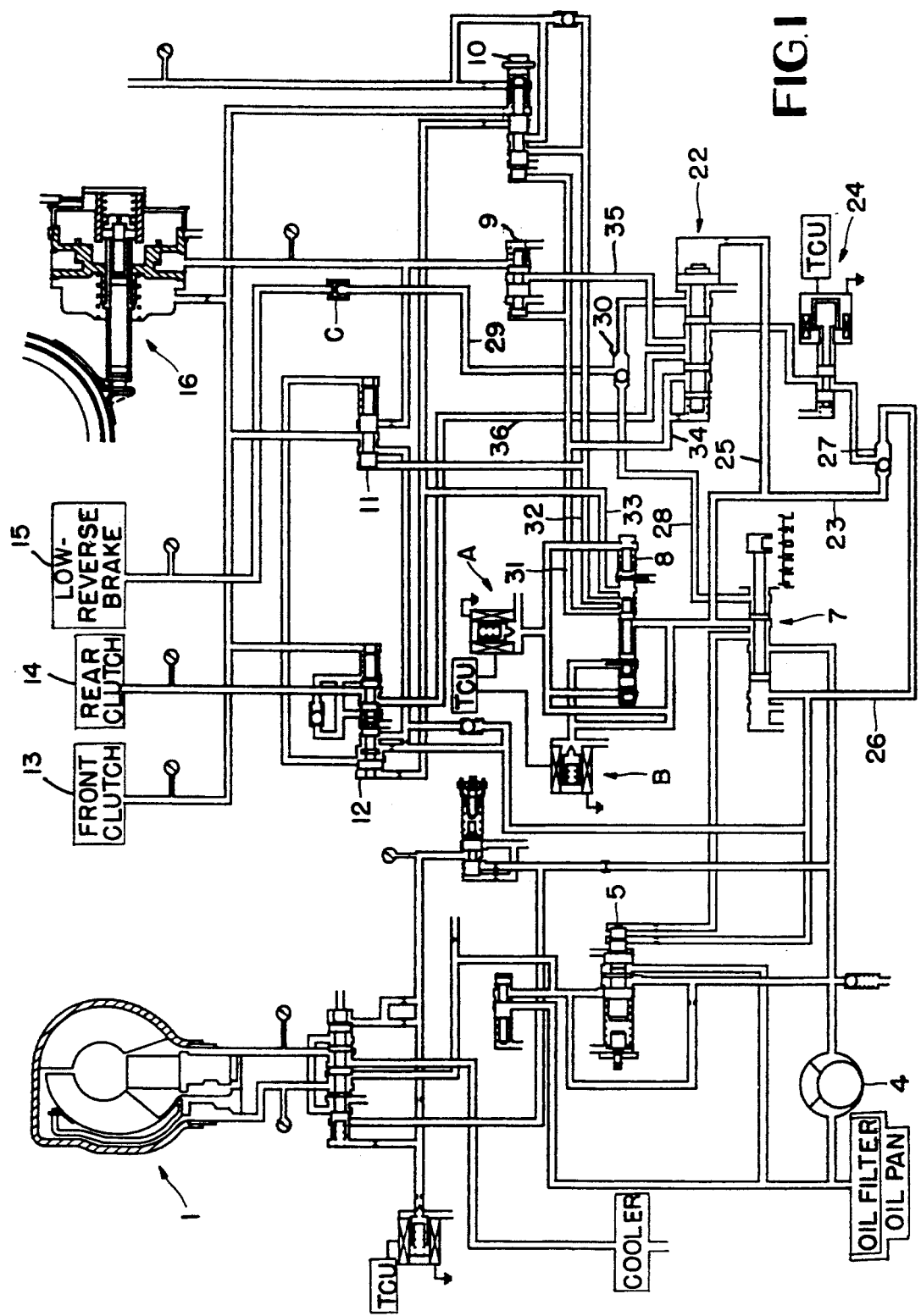
FIG. 1 is a circuit diagram of a hydraulic control system for an automatic transmission according to the present invention.

FIG. 1 is a circuit diagram of a hydraulic control system for an automatic transmission according to the present invention.

A manual valve 7, which is connected to an outlet of a fluid pump 4 and is provided with hydraulic pressure, is designed to deliver line pressure to a regulator valve 5 and a shift control valve 8 according to a position of a land being changed by a shift lever.

A line 23 branched off from a line which connects the manual valve 7 to the shift control valve 8 is connected with a proportional solenoid valve 24, so that the hydraulic pressure generated from the fluid pump is changed linearly and transmitted to an R-N-D control valve 22. A line 25 branched off from the line 23 is connected to the R-N-D control valve, thereby applying the hydraulic pressure to a valve 22 spool of the R-N-D control valve 22.

Further, a line 26 connected to the manual valve 7 is connected to the line 23, and a check ball 27 is mounted on this connecting part and designed to selectively interrupt the hydraulic pressure delivered to the proportional solenoid valve 24.

When the hydraulic pressure is supplied through the line 23, the check ball 27 is pushed to the right to interrupt the hydraulic pressure supplied from the line 26.

When the hydraulic pressure is supplied through the line 26, the check ball 27 is pushed to the left to interrupt the hydraulic pressure supplied from the line 23.

The line 26 is connected to the regulator valve 5 and designed to supply pressure necessary for an "R" range.

In the first speed of a "D" range, the hydraulic pressure of the line 23 connected to the shift control valve 8 is exhausted as two shift control solenoid valves A and B are turned ON, and the hydraulic pressure of the line 23 operates a rear clutch 14 via the proportional solenoid valve 24, the R-N-D control valve 22, and a rear clutch relief valve 12.

Another line 28 also connected to the manual valve 7 leads into the left of the largest land of the R-N-D valve 22, and a line 29 branched off from the line 28 is connected to a low reverse brake 15 according to the position of a check ball 30.

The second, third and fourth speed lines 31, 32 and 33 are connected to each port of the above shift control valve 8, and respectively lead to a first-second speed shift valve 9, an end clutch valve 10, a second-third and fourth-third speed shift valve 11, and the rear clutch relief valve 12. The second speed line 31 is equally connected with the first-second speed shift valve 9 and the end clutch valve 10, and the line 34 connects the line 31 to the left and the right of a land for the R-N-D control valve 22 where a spring is mounted.

Further, the third line 32 is connected to the end clutch valve 10, the end clutch 17 and the second-third and fourth-third speed shift valve 11, and the fourth speed line 33 is connected to the end clutch valve 10 and the rear clutch relief valve 12.

The R-N-D control valve 22 is connected to the first-second speed shift valve 9 through a line 35 and connected to the rear clutch relief valve 12 through another line 36.

Figure 2:
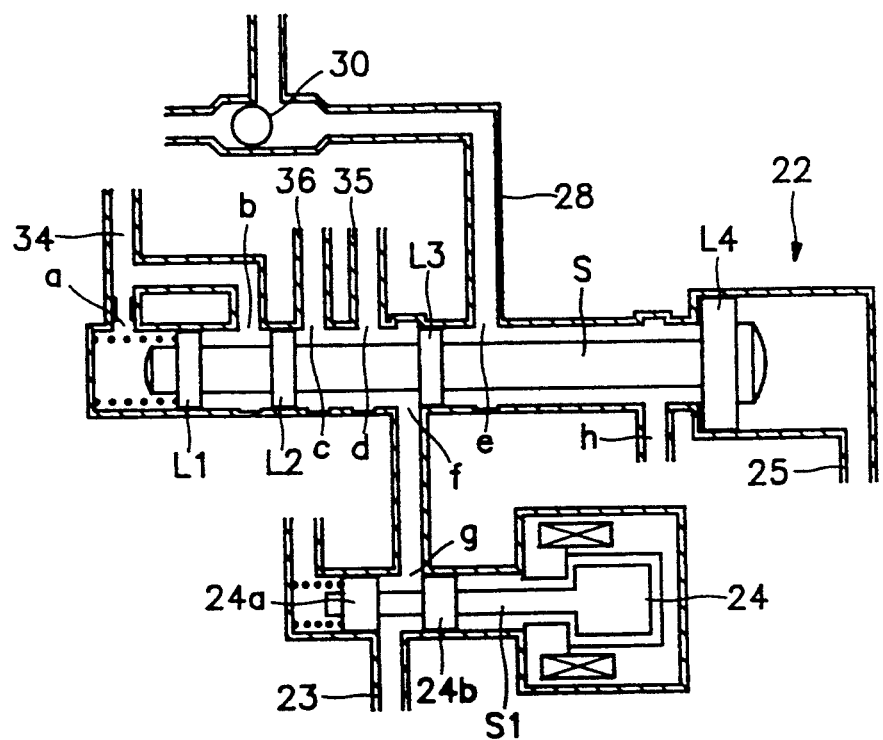
FIG. 2 is a side sectional view of an R-N-D control valve according to the present invention.

FIG. 2 is a side sectional view of the R-N-D control valve 2 according to the present invention. A valve housing includes two ports "a" and "b" which are connected to the line 34 branched off from the second speed line 31, a port "c" connected to the rear clutch 14 by the line 36, a port "d" connected to the first-second shift valve 9 by the line 35, a port "e" connected to the low reverse brake 15 by the line 28, a port "f" into which control pressure controlled by the proportional solenoid valve 24 flows, and a port "h" provided with the hydraulic pressure of the line 25.

In the valve housing, a spool S that is elastically supported by a spring and receives rightward force is mounted. The spool S has three lands L1, L2 and L3 with the same areas and a large land L4 influenced by line 25 pressure.

When a shift lever is manually shifted from an "N" range to a "D" range, the hydraulic pressure generated from the fluid pump 4 is transferred to the first speed line 23 via the manual valve 7. The hydraulic pressure pushes the check ball 27 to the right, and flows into the proportional solenoid valve 24, cutting off the reverse line 26.

At this point, high current flows within the linear proportional solenoid valve 24 and a spool Sl is drawn to the left so that the land 24 does not fully open the port "g" whereby the low control pressure begins to flow into the port "f" of the R-N-D control valve 22. Such control is performed by a transmission control unit (TCU).

As this operation is performed, and low current flows into the linear valve 24, the land is moved to the right by the elastic force of the spring. Accordingly, its path is completely opened, and high control pressure flows into the R-N-D control valve 22. At the same time, the high control pressure flows into the right side of the R-N-D control valve 22, along with the line branched off from the line 23 to push the land L4 to the left (see FIG. 3A).

Figure 3A:
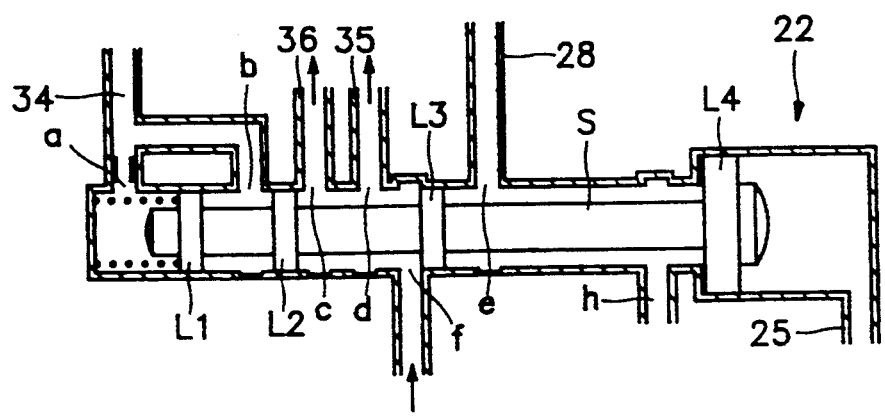
FIGS. 3A, 3B and 3C depict the operation state of the R-N-D control valve according to the present invention.

As shown in FIG. 3A, the control pressure that flows into the port "f" flows into the ports "c" and "d". The control pressure which flows into the port "c" is transferred to the rear clutch 14 along the line 36 via the rear clutch relief valve 12 to operate the rear clutch 14. The control pressure which flows into the port "d" is transferred to first-second speed shift valve 9 along the line 35 and stands by for a next shift stage (see FIG. 1).

The hydraulic pressure transferred to the first-second shift valve 9 stands by for the next shift stage, and operates the rear clutch 14 via the rear clutch relief valve 12, Therefore, since the control pressure is gradually increased by the control of the proportional solenoid valve 24, a smooth shift is realized.

In the first-second shift at this state, the spool of the shift control valve 8 is somewhat moved to the right by the operation of the shift control solenoid valve A controlled by a TCU to open the second speed line 31.

Figure 3B:
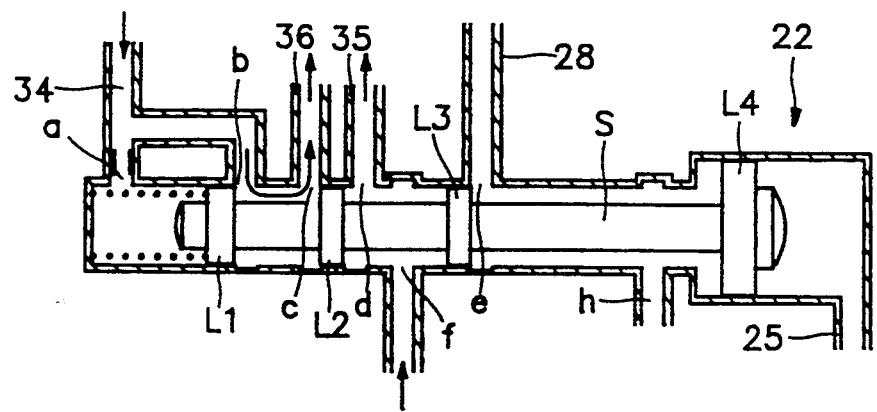

Accordingly, the second speed hydraulic pressure is delivered to the ports "a" and "b" of the R-N-D control valve 22 along with the lines 31 and 34 to work to the right and left sides of the land L1, and the valve spool 5 is somewhat moved to the right by the elastic force of the spring mounted on the left side of the land L2, so that the land L1 is placed between the ports "c" and port "d" (see FIG. 3B).

The hydraulic pressure delivered to the port "b" along line 34 is transmitted to the rear clutch 14 via the rear clutch relief valve 12 along the line 36 through the port "c", and the control pressure flows into the port "f" and is transmitted to the first-second speed shift valve 9 along the line 35 via the port "d".

Then, the second speed hydraulic pressure is transmitted to the rear clutch 14 through the rear clutch relief valve 12 and operates the rear clutch, and as current of the linear valve 24 is linearly applied by the TCU, the small control pressure is delivered to the first-second speed shift valve 9 through the R-N-D control valve 22. The second pressure of the second speed line 31 flows into the left side of the first-second speed shift valve 9 so as to push the valve spool thereof to the right.

Accordingly, the control pressure delivered via the line 35 flows into the kick down servo 16, and according to the proportional control of the R-N-D control valve 22, the hydraulic pressure is changed linearly so that a smooth shifting operation is performed.

Controlling with the control pressure in a third-fourth speed up shift is the same as the above-mentioned operation, and therefore, a full description thereof is omitted.

When a shift lever is shifted from an "N" range to an "R" range, the hydraulic pressure generated from the fluid pump 4 flows into the proportional solenoid valve 24 via the line 26 and the manual valve 7. At this point, as the linear valve 24 is controlled by the TCU, the hydraulic pressure is changed to control pressure and flows in the R-N-D control valve 22 to enter and operate the low reverse brake 15.

Figure 3C:
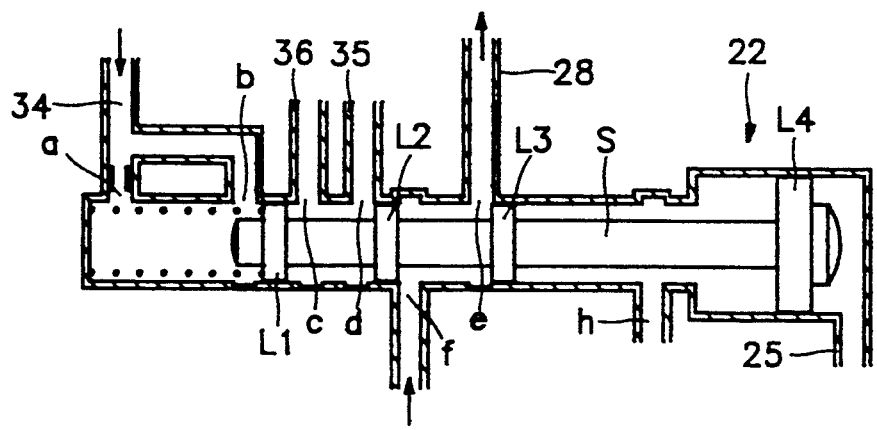

Since the hydraulic pressure is not delivered to the lines 23 and 25 in this process, the hydraulic pressure working on the land L4 of the R-N-D control valve 22 is relieved whereby the valve spool is moved to the right by the spring as shown in FIG. 3C.

At this point, the check ball 27 is moved to the right to interrupt the path, and passing the rear clutch relief valve 12 and the second-third and fourth-third shift valve 11, part of the hydraulic fluid operates the front clutch 13 and the low/reverse brake 15 and releases down servo 16 to carry out a reverse operation.

When the shift lever is shifted from a "D" range to an "L" range, the hydraulic fluid pressure generated from the fluid pump 4 flows along the line 23 via the manual valve 7, and as the hydraulic pressure pushes the check ball 27 to the right to cut off the reverse pressure operation passage, the proportional control is preformed in the linear valve 24, and thus, passing through the R-N-D control valve 22 is begun with the small control pressure.

This pressure is moved along the lines 35 and 36, and a part of the pressure stands by in the first-second shift valve 9, and another part thereof operates the rear clutch 14, passing through the rear clutch relief valve 12.

At this point, the hydraulic fluid also flows in the line 28 connected from the manual valve 7, and this hydraulic fluid pressure pushes the check ball 30 to the right to interrupt tire reverse pressure operation path, and goes by way of a check ball C. At the time of passing the check ball C, the hydraulic fluid is controlled by a predetermined pressure to operate the low reverse brake 15.

As described above, according to the R-N-D control valve of the present invention, valves used for relieving a shift impact and for controlling pressure can be unified to one valve having a simple structure, and the control pressure is controlled by carrying out the proportional control, whereby the shift impact can be relieved, as the control pressure increases linearly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic control system for an automatic transmission comprising:
   a fluid pump for generating hydraulic pressure;
   a torque converter for generating rotating power;
   a plurality of shift valves;
   a plurality of clutches and brake means controlled by said plurality of shift valves in proportion to forward and reverse speeds with the hydraulic pressure generated from said fluid pump and which selectively transmit the rotating power of said torque converter to each of a plurality of gear elements;
   a manual valve which is shifted by a shift lever and delivers the hydraulic pressure to each of plurality of shift valves;
   a proportional solenoid valve connected to the manual valve and controlled by a transmission control unit so as to proportionally control the hydraulic pressure;
   a reverse-neutral-drive control valve for reducing a shift impact which occurs when said manual valve is shifted from a neutral range to a drive/reverse range and a speed is up-shifted in the drive range as the hydraulic pressure is applied to said reverse-neutral-drive control valve via said manual valve and proportional solenoid valve, having a housing and a valve spool, said reverse-neutral-drive control valve including
   a first port for receiving hydraulic pressure generated from the fluid pump via the proportional solenoid valve when said manual valve is shifted from a neutral range to a drive/reverse range, second and third ports connected to a second speed line and respectively supplying hydraulic pressure to both sides of a first land of the valve spool, a fourth port for supplying the hydraulic pressure transmitted to said manual valve to one side of a second land formed to be larger than the first land of the valve spool, fifth and sixth ports which are selectively opened according to the position of a third land of the spool, the third land being changed by the hydraulic pressure which flows into the second and third ports, and the fourth port and having an equal diameter with the first land, and a first check ball mounted between said manual valve and proportional solenoid valve to selectively interrupt forward and reverse hydraulic pressures; and a shift control valve for selectively delivering the hydraulic pressure to the shift valve applied from said manual valve by the operation of two shift control solenoid valves controlled by the transmission control unit according to a vehicle speed;

said valve spool of said reverse-neutral-drive control valve further including a fourth land having an equal diameter with the first land, and an elastic element resisting the hydraulic pressure transmitted through the fourth port at one side of said valve spool.

2. The hydraulic control system according to claim 1, wherein the fifth port is connected to a rear clutch relief valve.

3. The hydraulic control system according to claim 1, wherein the reverse-neutral-drive control valves further include a seventh port connected to a low reverse brake.

4. The reverse-neutral-drive control valve according to claim 1, wherein said first check ball for selectively interrupting a drive operation pressure and a reverse pressure is mounted in a first speed line.

5. The reverse-neutral-drive control valve according to claim 1, wherein a second check ball for selectively interrupting low reverse operation pressure and control pressure is mounted between said third port and said low reverse brake.

6. A reverse-neutral-drive control valve of a hydraulic control system for an automatic transmission capable of facilitating a shift control with one valve by the proportional control of a linear valve when a shift lever is shifted respectively from a neutral to a drive range or reverse range, the combination of said control valve having a housing and a valve spool comprising:

a pair of second speed line ports connected to a second speed line, wherein the valve spool's movement position is controlled by being connected to a line divided from a forward control line and flowing a line pressure to a largest land;

a first port connected to a rear clutch;

a second port connected to a first-second speed shift valve;

a third port connected to a low reverse brake; and a fourth port for receiving a control pressure proportionally controlled as a hydraulic fluid generated from a fluid pump is moved along said forward control line when a manual range of a manual valve is shifted to reverse-neutral-drive or low.

7. A reverse-neutral-drive control valve of a hydraulic control system for an automatic transmission comprising:

a line connected between a manual valve and a shift control valve for connecting with an inlet port of a proportional solenoid valve;

a control pressure port for receiving a control pressure of the reverse-neutral-drive control valve and connected with an outlet port of the proportional solenoid valve;

a pair of a second speed line ports formed on both sides of a first land and connected to a branch conduit joined to a second speed line;

first and second ports formed between a second land and a third and connected to a first-second speed shift valve and a rear clutch relief valve so that a control presssure can be passed selectively; and a third port formed between the third land and a fourth land and leading to a low reverse brake so that the control pressure works in a reverse range.

* * * * *

UNITED STATES PATENT AND TRADEMARK OFFICE
CERTIFICATE OF CORRECTION

PATENT NO. : 5,367,922
DATED : Nov. 29, 1994
INVENTOR(S) : Jaeduk Jang

It is certified that error appears in the above-indentified patent and that said Letters Patent is hereby corrected as shown below:

On title page, item [75] Inventor:

please change "Jaedeog Jang" to

--Jaeduk Jang--

Signed and Sealed this

Eighth Day of October, 1996

Attest:

BRUCE LEHMAN

Attesting Officer

Commissioner of Patents and Trademarks